United States Patent [19]

Vanderhoff et al.

[11] 4,177,177

[45] Dec. 4, 1979

[54] POLYMER EMULSIFICATION PROCESS

[76] Inventors: John W. Vanderhoff, 345 9th Ave., Bethlehem, Pa. 18018; Mohamed S. El-Aasser, 1201 N. Maxwell St., Allentown, Pa. 18103; John Ugelstad, SINTEF, 7034 Trondheim-NTH, Trondheim, Norway

[21] Appl. No.: 873,067

[22] Filed: Jan. 27, 1978

Related U.S. Application Data

[63] Continuation of Ser. No. 670,908, Mar. 26, 1976, abandoned.

[51] Int. Cl.$^2$ .............................................. C08L 83/04
[52] U.S. Cl. ................................ 260/29.2 M; 106/170; 260/29.2 EP; 260/29.2 E; 260/29.2 TN; 260/29.2 UA; 260/29.2 R; 260/29.6 PM; 260/29.6 ME; 260/29.6 MH; 260/29.6 MN; 260/29.7 GP; 260/29.7 N; 260/29.7 E; 260/29.7 EM
[58] Field of Search .............. 260/29.7 EM, 29.7 PM, 260/2.5 N, 2.5 M, 29.2 M

[56] References Cited

U.S. PATENT DOCUMENTS

| | | | |
|---|---|---|---|
| 3,445,414 | 5/1969 | Glymph et al. | 260/29.6 PM |
| 3,503,917 | 3/1970 | Burke, Jr. | 260/29.6 PM |
| 3,719,572 | 3/1973 | Burke, Jr. | 260/29.6 PM |
| 3,888,812 | 6/1975 | Pleittner | 260/24 |

FOREIGN PATENT DOCUMENTS

| | | | |
|---|---|---|---|
| 607704 | 9/1948 | United Kingdom | 260/29.6 PM |
| 627612 | 8/1949 | United Kingdom | 260/29.6 PM |

*Primary Examiner*—Morton Foelak
*Attorney, Agent, or Firm*—Samson B. Leavitt; Michael A. Leavitt

[57] ABSTRACT

A polymer emulsification process comprising intimately dispersing a liquified water insoluble polymer phase in an aqueous liquid medium phase containing at least one nonionic, anionic or cationic oil-in-water functioning emulsifying agent, in the presence of a compound selected from the group consisting of those hydrocarbons and hydrocarbyl alcohols, ethers, alcohol esters, amines, halides and carboxylic acid esters which are inert, non-volatile, water insoluble, liquid and contain a terminal aliphatic hydrocarbyl group of at least about 8 carbon atoms, and mixtures thereof, and subjecting the resulting crude emulsion to the action of comminuting forces sufficient to enable the production of an aqueous emulsion containing polymer particles averaging less than about 0.5 μ in size.

28 Claims, No Drawings

POLYMER EMULSIFICATION PROCESS

This is a continuation of application Ser. No. 670,908, filed Mar. 26, 1976 now abandoned.

This invention relates to a method of producing an aqueous polymer emulsion, and more particularly to a method for producing such an emulsion wherein the polymer particle sizes are relatively small by emulsification of the polymer.

In general, aqueous polymer emulsions may be prepared by emulsion polymerization (of a monomer) or by emulsification (of a pre-formed polymer). The polymer emulsions prepared by emulsion polymerization contain adequately small size polymer particles averaging about 0.1 to 0.3$\mu$ but the precursor monomers are limited to those polymerizable in an aqueous medium in the presence of free-radical initiators or the like. Polymer emulsions from monomers not so polymerizable are prepared by emulsifying the previously polymerized monomers by any one of three general types of emulsification procedures, namely:

(1) direct emulsification of an organic solvent solution of the polymer in water using an oil-in-water type emulsifier to form droplets or particles of the polymer solution dispersed in water, after which the solvent may then be removed as by stripping or other method of removal. This method generally yields average polymer droplet sizes in the emulsion of about 1$\mu$ or larger.

(2) inversion emulsification of the polymer solution by adding water thereto in the presence of an oil-in-water emulsifier which can function at least partially effectively as a water-in-oil emulsifier so that an emulsion of water-in-polymer solution is initially formed which, upon further addition of water, inverts to form a polymer solution-in-water emulsion. This method, however, generally calls for greater care and control than method (1) and in addition yields average polymer droplet sizes in the emulsion of about 0.8–1.0$\mu$ or larger.

(3) emulsification by neutralization in which the polymer is prepared with functional acidic or basic groups and is emulsified in water by neutralizing these groups. Although this method can yield average polymer droplet sizes as small as 0.1$\mu$, films cast from such emulsions are usually water-sensitive due to the significant proportions of functional acidic or basic groups in the polymer.

It is accordingly generally preferable to employ the above direct emulsification method (1). The five-fold difference in particle size between latexes prepared by this method (minimum 1$\mu$) and latexes prepared by emulsion polymerization (0.2$\mu$) is however critical with respect to stability or resistance to settling or sedimentation. According to the Stoke's law, for spherical particles, $$\text{rate of sedimentation} = (D^2/18\eta)(d_p - d_m)g$$

where D is the particle diameter, $\eta$ the viscosity of the medium, $d_p$ and $d_m$ the densities of the particles and the medium, respectively, and g the gravitational constant.

The tendency for colloidal particles to settle upon standing is offset by their Brownian motion and the convection currents arising from small temperature gradients in the sample. The Brownian motion, which results from the unbalanced collisions of solvent molecules with the colloidal particles, increases in intensity with decreasing particle size. The convection currents depend upon the sample size and storage conditions. One criterion for settling is that a sedimentation rate of 1 mm. in 24 hours will be offset or nullified by the thermal convection currents and Brownian motion within the sample (Overbeek, in "Colloid Science, Vol. I", H. R. Kruyt, editor, Elsevier, Amsterdam, 1952, p. 80). Substituting this sedimentation rate in the above Stoke's equation enables determination of the largest particle size which, in any particular instance, will not settle out upon standing.

Thus, for polystyrene (density $d_p = 1.05$ gm/cm$^3$) dispersed in water (density $d_m = 1.00$, viscosity $\eta = 1$ cp), the largest particle size which will not settle on standing is 0.65$\mu$. This calculated critical particle size is consistent with experimental observations that 1.0$\mu$ diameter monodisperse polystyrene latex particles settle out on standing within 1–3 months, 0.8$\mu$ diameter particles settle out within 3–6 months, and particles of 0.5$\mu$ or smaller never settle out at all. As a matter of fact, 1$\mu$ diameter particles of most polymers, the minimum size generally produced by the direct emulsification method, settle at a relatively rapid rate which can be reduced by raising the viscosity of the water phase in some manner.

It is an object of this invention to provide a direct polymer emulsification process which will not be subject to one or more of the above disadvantages.

Another object of this invention is the provision of such a process effective for producing aqueous emulsions of polymer particles averaging less than about 0.5$\mu$, and generally about 0.1 to about 0.3$\mu$, in size (diameter).

Still another object of this invention is the provision of such a process which is relatively uncomplicated and capable of operation without difficulty and/or at relatively low cost.

A further object of the invention is the provision of such a process effective for producing aqueous polymer emulsions with improved stability or resistance to sedimentation.

Other objects and advantages will appear as the description proceeds.

The attainment of one or more of the above objects is made possible by this invention which includes a polymer emulsification process comprising intimately dispersing a liquified water insoluble polymer phase in an aqueous liquid medium phase containing at least one nonionic, anionic or cationic oil-in-water functioning emulsifying agent, in the presence of a compound selected from the group consisting of those hydrocarbons and hydrocarbyl alcohols, alcohol esters, amines, halides, ethers, carboxylic acid esters which are inert, non-volatile, water insoluble, liquid and contain a terminal aliphatic hydrocarbyl group of at least about 8 carbon atoms, and mixtures thereof, and subjecting the resulting crude emulsion to the action of comminuting forces sufficient to enable the production of an aqueous emulsion containing polymer particles averaging less than about 0.5$\mu$ in size.

When the liquified polymer phase in the emulsion so produced is a solution of the polymer in a volatilizable substantially water immiscible organic solvent, it is usually desirable to remove the solvent from the polymer phase, as by stripping or the like, thereby producing an emulsion which is solvent-free and thus not subject to objection on the basis of flammability, pollution and the like.

It has previously been recognized that the addition of long chain fatty alcohols increases the capacity of anionic emulsifiers to disperse and stabilize oil-in-water emulsions; J. W. Shulman and E. G. Cockbain, Trans. Faraday Soc., 36, 651 (1940). For example, British Pat. Nos. 607,704 and 627,612 disclose mixing cetyl or stearyl alcohol or the like with acrylic ester, methacrylic ester, or vinyl carboxylic acid ester monomer and emulsifying the mixture in an aqueous medium containing an anionic emulsifier to produce an emulsion suitable for polymerization. An article in Pure Appl. Chem. 25 121 (1971) describes the use of anionic emulsifier-fatty alcohol combinations in the emulsion polymerization of vinyl chloride monomer. And our article "Emulsion Polymerization: Initiation of Polymerization in Monomer Droplets," Polymer Letters 11, 503 (1973) discloses that anionic emulsion of styrene monomer in water with droplet sizes as small as $0.2\mu$ can be prepared using a sodium lauryl sulfate-cetyl alcohol mixed emulsifier combination. However, none of these publications deal with the direct emulsification of previously formed polymers to yield stable, very fine particle size polymer emulsions or the problems peculiar thereto.

The process of this invention may be employed for emulsifying any polymer which is water insoluble, liquifiable at the temperature of the emulsification process, i.e., below the boiling point of the aqueous medium phase, and inert to the other non-polymer substances employed in the process, i.e., water, the emulsifying agent, the non-volatile, water insoluble, higher hydrocarbyl-containing liquid, and any volatilizable water-immiscible solvent. The polymer may be liquifiable by reason of being normally liquid or meltable at the temperature of the process, and/or soluble at such temperature in an inert, volatilizable, substantially water-immiscible organic solvent system. The viscosity of the liquified, water insoluble polymer must of course be low enough to permit the polymer phase to be dispersed or broken up into droplets in the aqueous medium phase. This generally calls for a viscosity of less than about 10,000 cps.

The above-defined polymer may be of any type and chemical constitution, natural or synthetic, organic or inorganic, homopolymeric or random, block or graft copolymeric (from two or more monomers), amorphous or crystalline, atactic, isotactic or syndiotactic, condensation or addition polymerized and/or crosslinked, thermoplastic or thermosetting, non-further polymerizable or further polymerizable (e.g. prepolymer), and of any suitable molecular weight ranging generally from about 350 to 1,000,000 or more.

The following examples of more or less commercially available polymers are only illustrative of the above-described polymers which may be emulsified by the process of this invention:

Low (branched) and high (linear) density polyethylene, polypropylene, poly (propylene/ethylene), other homo- and co-polymers of alpha-olefins including poly (4-methylpentene-1), poly (1-butene), polyisobutylene and higher homologs, poly (ethylene/vinyl acetate), poly (ethylene/maleic anhydride), poly (ethylene/isobutylene), chlorinated or chlorosulfonated polyethylene, natural rubber (cis-1,4-polyisoprene), chlorinated, oxidized or cyclized rubber, rubber hydrochloride, gutta percha or balata, (trans-polyisoprene), the corresponding synthetic polyisoprenes, poly (styrene/butadiene) rubber (SBR), poly (butadiene/acrylonitrile), cis- or trans-1,4-polybutadiene, poly (isoprene/isobutylene), neoprene, ethylene/propylene/diene terpolymers (EPDM), polystyrene, copolymers of styrene with acrylonitrile, fumaronitrile, 2,5-dichlorostyrene, N-vinylcarbazole, N,N-diphenylacrylamide, divinyl benzene or methyl methacrylate, poly (alpha-methylstyrene), poly (p-tert-butylstyrene), polychlorostyrene, poly (acrylonitrile/butadiene/styrene) resin (ABS), coumarone/indenes, polyterpenes, polymers or copolymers from acrylic, methacrylic, hydroxyalkyl acrylic or methacrylic, cyano acrylic or methacrylic acids or their methyl, ethyl or lauryl esters, polyacrylonitrile, vinyl acetate homopolymer or copolymers with dibutyl fumarate, vinyl stearate, vinyl chloride, 2-ethylhexyl acrylate or ethyl acrylate, poly (vinyl butyral), homopolymers of vinyl chloride or vinylidene chloride or copolymers with each other or with diethyl fumarate, diethyl maleate, acrylates or methacrylates, polychlorotrifluoroethylene, poly-vinyl or vinylidene fluoride and copolymers with chlorotrifluoroethylene or hexafluoropropylene, synthetic superpolyamides or nylons 6,66,610, 11 or 12 or their copolymers, poly (vegetable oil acid/ethylene diamine), polyoxymethylene, poly (ethylene oxide), ethylene dihalide/alkali sulfide polysulfide rubbers, cellulose acetate, acetate butyrate, propionate, acetate propionate or nitrate, ethyl cellulose, poly (ethylene terephthalate) or other polyesters of polyhydric alcohols and dicarboxylic acids, polyether, polyester or polyester/polyamide polyurethanes, phosgene/bisphenol A polycarbonates, poly (2,6-dimethyl phenylene oxide), poly (diphenylene sulfone), poly (p-oxybenzoate), poly (phenylene amide), poly (p-phenylenes), poly (xylylenes), aromatic dianhydride/aromatic amine polyimides, polybenzimidazole, polybenzothiazole, polybenzoxazole, polythiadiazole, polyoxadiazole, polyphenyltriazole, polyphenylsilsesquioxane, silicon/nitrogen, phosphorus/nitrogen or boron/nitrogen inorganic linear polymers, phenol, urea or melamine formaldehyde condensation polymers, styrenated unsaturated polyesters, epoxy resins by condensation of epichlorohydrin with bisphenol A, resorcinol, hydroquinone, glycols or glycerol, if desired in conjunction with curing agents such as polyamines, polyamides, polysulfides, urea or phenol formaldehydes, acids or acid anhydrides, poly dimethyl-siloxane or other polysilicones, alkyd resins, diallyl phthalate or allyl diglycol carbonate prepolymers, furane resins, phenolic furfural, polyvinyl formal, polyvinyl acetal and various other copolymers thereof and the like.

When the polymer is not per se liquifiable, i.e., liquid of sufficiently low viscosity at the temperature employed in the emulsifying process (obviously below the boiling point of the aqueous medium under normal, sub- or super-atmospheric pressure), the polymer is dissolved in a relatively low molecular weight, substantially water immiscible organic solvent. The solvent may consist of a single liquid compound, or a mixture of two or more. Such mixtures may contain minor proportions of one or more water miscible or water soluble compounds, sometimes employed to assist in solubilizing the polymer. For maximum efficiency and economy, the resulting polymer solution should contain a solids content as high as possible, consistent of course with the required low, dispersible viscosity. Polymer concentrations may for example range from as low as about 5% to as high as about 95% by weight, usually about 10% to about 80%, and preferably about 15% to about 70%. The solvent is generally a relatively low molecular weight alcohol, ketone, ether, ester or aliphatic, alicyclic, or aromatic hydrocarbon, or halogenated derivatives thereof.

The solvent is preferably one which may be readily removed in known manner following the comminuting step of the present process since in most instances an emulsion is desired which is devoid of organic solvents posing problems of flammability, pollution, toxicity and/or odor and the like. Steam distillation being usually employed for such removal, or other evaporative stripping method, the solvent, whether a single compound or mixture thereof, or its hydrotrope with water, should be readily volatilizable by the selected method of removal, as for example by having a boiling point below that of the water in the system.

As merely illustrative of operative solvents, there may be mentioned butanol, pentanol, cyclopentanol, methyl isobutyl ketone, secondary butyl methyl ketone, diethyl ketone, ethyl isopropyl ketone, diisopropyl ketone, diethyl ether, secbutyl ether, petroleum ether, ligroin, propyl acetate, butyl and isobutyl acetate, amyl and isoamyl acetate, propyl and isopropyl propionate, ethyl butyrate, pentane, hexane, heptane, cyclopentane, cyclohexane, cycloheptane, methylene chloride, carbon tetrachloride, hexyl chloride, chloroform, ethylene dichloride, benzene, toluene, xylene, chlorobenzene, and mixtures thereof with each other and/or more water soluble solvents (in minor proportions).

The solvent should be devoid of an aliphatic hydrocarbyl group of 8 or more carbon atoms, and inert in the emulsion except when it serves as a reactant, hardening or curing agent for the polymer such as phenyl glycidyl ether, a curing agent for epoxy polymers. These latter non-inert materials of course need not be volatilizable.

The oil-in-water functioning emulsifying agents employed in the process of this invention are well known in the art, being generally surface active agents also useful in the detergent field. Any of these known anionic, polar and non-polar nonionic, amphoteric or ampholytic, Zwitterionic, and cationic surface active detergents or emulsifying agents, and mixtures thereof, are operative, being for example fully described in U.S. Pat. No. 3,762,859 at column 3, line 6 to column 8, line 15, which description is incorporated herein by reference thereto. Those preferred are the anionics, particularly the sodium $C_{10-20}$ alkyl sulfates such as sodium lauryl or hexadecyl sulfate, the cationics, particularly the quaternary ammonium halides such as hexadecyl trimethyl ammonium bromide or octadecyl pyridine bromide, and the non-polar nonionics, particularly the reaction products of 1 mole of a $C_{8-18}$ alkyl phenol or $C_{10-20}$ alkanol or fatty acid with about 5 to about 50 moles of ethylene oxide (E.O.) such as octyl phenol/40 E.O., lauryl alcohol/12 E.O., and tall oil fatty acid/20 E.O. However, any other suitable type of oil-in-water functioning emulsifying agent may be employed without departing from the spirit and scope of this invention.

The emulsifying agent is operative in the aqueous medium in relatively low concentrations, being generally included therein in proportions of about 0.1 to about 5%, preferably about 0.2 to about 3%, by weight of the water in the aqueous phase.

The higher aliphatic hydrocarbyl-containing additive compound, or mixture thereof, required in carrying out the process of this invention is generally employed in proportions of about 0.2% to about 12%, preferably about 0.4% to about 6%., by weight of the polymer phase. The terminal aliphatic hydrocarbyl group of at least about 8 carbon atoms contained therein may be unsaturated but preferably saturated, and branched but preferably straight chain. These additives should be relatively highly water-insoluble e.g. to the extent of less than about $10^{-3}$ grams, preferably less than about $10^{-4}$ grams, per liter of water in the aqueous phase. They should not have too high a molecular weight, e.g. not more than about 5,000, preferably not more than about 2,000, and still more preferably from about 110 to about 500.

As only illustrative of the types of such additive compounds operative herein, there may be mentioned: aliphatic hydrocarbons such as n-octane, n-decane, n-tetradecane, n-hexadecane, n-octadecane, eicosane, tetracosane, 1-decene, 1-dodecene, 2-hexadecyne, 2-tetradecyne, 3-octyne, 4-octyne, 1-tetradecene, 2,3,4,4,6,8,8-heptamethyl nonane ($C_{16}H_{34}$), 2,6,10,14-tetramethyl pentadecane (Pristan, $C_{19}H_{40}$), and 2,6,10,15,19,23-hexamethyl tetracosane (Squalan, $C_{30}H_{62}$), alicyclic hydrocarbons such as dodecyl cyclohexane, aromatic hydrocarbons such as hexadecyl benzene, hydrocarbyl alcohols such as tetradecanol, cetyl alcohol (hexadecanol), eicosanol, 1-heptadecanol and ceryl alcohol (1-hexaeicosanol), hydrocarbyl alcohol esters of lower molecular weight carboxylic acids such as cetyl acetate, hydrocarbyl amines such as tetradecyl, hexadecyl and octadecyl amine, hydrocarbyl halides such as hexadecyl chloride and other chlorinated paraffins, hydrocarbyl ethers such as octyl and cetyl ether, and hydrocarbyl carboxylic acid esters of lower molecular weight alcohols such as methyl, ethyl and isoamyl octanoate, methyl and octyl caprate, ethyl stearate, isopropyl myristate, methyl, isoamyl and butyl oleate, glyceryl tristearate, soybean oil, coconut oil, tallow, laurin, myristin, olein and the like.

The above-described additive compounds may be included in either the aqueous medium phase or in the polymer phase prior to their admixture. For example, the preferred $C_{10-20}$ n-alkanes, and the remaining hydrocarbons, hydrocarbyl amines, ethers, alcohol esters, carboxylic acid esters, and halides are generally included in the polymer phase, and the preferred $C_{14-20}$ n-alkanols and other hydrocarbyl alcohols in the aqueous phase. The type of polymer phase, temperature, etc. are often factors to be considered in making the choice between inclusive in one phase or the other. Further, as a rule of thumb, when the additive is included in the aqueous phase, its weight ratio relative to the emulsifying agent is generally more than 1:1, especially up to ca. 4-2:1. When included in the polymer phase, the ratio is about 0.3:1 to 1:1 in most cases.

These additive compounds increase the stability of these fine-sized particle emulsions by inhibiting sedimentation or degradation caused by the tendency of the small particles or droplets to coalesce or diffuse molecularly. They should hence be inert, and resistant to diffusion into the aqueous medium phase and to any solvent removal procedures applied after the comminuting step. This calles for the above-described properties of water-insolubility, and non-volatility under the conditions of such solvent removal step. They generally have boiling points above about 150° C. They must also be liquid under the emulsification conditions of the present process, i.e., melting points below and boiling points above the temperatures obtaining in the process, or soluble in a solvent therein.

In carrying out the process of this invention, the described liquified polymer phase is admixed with stirring or other agitation (e.g. "Lightning Mixer") into the described aqueous medium phase containing the emulsifying agent, desirably at temperatures above room temperatures to below the boiling point of the aqueous medium (at the pressure employed-normal, sub-or super-atmospheric), generally ranging from about 40° to about 90° C., preferably about 55° to about 75° C.

As indicated above, it is desirable to produce emulsions with as high a solids content as possible, and accordingly the ratio of the liquified polymer phase to the aqueous medium phase sould be as high as possible without of course introducing inversion possibilities, i.e., emulsification of the aqueous phase in the polymer phase. The weight ratio of the polymer phase to the aqueous phase generally will range from about 0.1:1 to about 2:1, more preferably about 0.2:1 to 1:1, most preferably about 0.2:1 to 0.4:1.

The resulting crude emulsion of coarse polymer phase droplets is then subjected, at temperatures similar to those specified for the initial emulsification, to the action of comminuting forces sufficient to enable the production of an aqueous emulsion containing polymer particles averaging less than about $0.5\mu$, desirably less than about $0.3\mu$ to about $0.1\mu$ or lower. Means for applying such comminuting forces are well known in the art and are a matter of judicious selection in carrying out the present process. Such forces may be of any type, e.g. shear, attrition, impact, explosion, implosion, or any combination thereof. A number of types of devices for subjecting the crude emulsion to such comminuting forces are commercially available, including homogenizers, submicron dispersers, colloid mills, ultrasonic vibrators, and the like.

One such commercially available device is the Manton-Gaulin Model 15M-8TA Laboratory Homogenizer and Submicron Disperser (Manton-Gaulin Co.). The crude emulsion is forced through a small orifice at pressures up to 8,000 psi; the rapid increase in velocity between the valve stem and seat causes cavitation of the liquid and the formation of bubbles; the collapse of these bubbles sets the valve stem into vibration at high frequencies (20-50 kilocycles/sec.), which breaks the emulsion droplets to a smaller size. The homogenized emulsion can be recycled through the orifice by use of a 3-way valve in the device to direct it back to the supply tank.

Another such commercially available device is the Model W-350 Sonifier Cell Disruptor (Heat System-Ultrasonics, Inc.), which converts a 110-volt AC line voltage to electrical energy with a frequency above the audible range (20 kilohertz). A sonic converter transforms this energy into mechanical energy at the same frequency, which in turn is transmitted through an 0.75 inch horn tip into the liquid being treated. The ultrasonic waves cause cavitation in the liquid, producing a tearing action at any phase boundaries in the system.

The above-described crude emulsion is passed or recycled through such comminuting device a sufficient number of times, usually two, three or more times, until an emulsion is obtained containing the desired small size polymer phase particles. If such polymer phase comprises a polymer solution in an organic solvent as described above, and such solvent is subsequently removed, the average size of the particles in the comminuted emulsion need not be as low as $0.5\mu$. This is because the subsequent removal of the solvent from the dispersed polymer phase droplets can be relied upon to further reduce such size to the desired level below $0.5\mu$, preferably below $0.3\mu$ to $0.1\mu$ or lower.

Stripping or removal of any solvent from the comminuted emulsion is likewise carried out in known manner, preferably by steam distillation. Mere sparging with steam is not entirely satisfactory. The high temperature (100° C. or higher) and the sparging action of the steam often have an adverse effect on the latex (emulsion) stability. Morever, the latex is usually further slightly diluted during the steam distillation.

It is accordingly preferred to carry out the steam distillation at reduced pressures and temperatures, e.g. as low as about 150 mm. Hg pressure and corresponding temperatures (e.g. 25°-30° C.). This milder vacuum steam distillation has less adverse effect on the latex stability, and the latex can be simultaneously concentrated by use of some of the water in the latex to generate steam. The desired vacuum steam distillation may be carried out in any commercially available device, for example in a Buchler Flash Evaporator.

The following examples are only illustrative of preferred embodiments of this invention and are not to be regarded as limitative. All amounts and proportions referred to herein and in the appended claims are by weight unless otherwise indicated. Deionized water is employed in the examples.

Example 1

| Ingredients | gm |
| --- | --- |
| Epon Resin 1001* | 100.00 |
| Toluene-Methylisobutyl Ketone (1:1) | 300.00 |
| Sodium Lauryl Sulfate | 2.78 |
| Cetyl alcohol | 5.50 |
| Water | 1200.00 |

*Solid Resin at room temperature with a melting point of 65°-76° C. Epichlorohydrin/bisphenol A epoxy prepolymer, avg. Mol. Wt. about 900; Shell Chemical Company.

The sodium lauryl sulfate and cetyl alcohol are dissolved in water by heating for 30 minutes at 63° C. in a 3-liter beaker equipped with paddle stirrer operated at 300 rpm. The prepolymer solution is prepared by dissolving the Epon 1001 in the 1:1 mixture of toluene and methyl isobutyl ketone by stirring at room temperature. A crude emulsion is then prepared by adding the prepolymer solution to the water phase containing the sodium lauryl sulfate-cetyl alcohol mixture in the 3-liter beaker with stirring at 63° C., and the stirring continued for 30 minutes after the prepolymer solution has been added. The crude emulsion comprises microscopic droplets of about $1-100\mu$ in diameter as determined by optical microscopy. The crude emulsion is then subjected to homogenization by passage twice through the Manton-Gaulin Submicron Disperser operating at 6000 psi, after which the average droplet size by optical microscopy is in the range of $0.2-1\mu$, with most of the droplets being about $0.2\mu$ in size. The homogenized emulsion of fine droplet size is then placed in a rotating flask of the Buchler Flash Evaporator and slowly rotated at 50° C. and 100 mm Hg vacuum to remove the solvent and concentrate the polymer emulsion. This treatment is continued for about three hours, after which a stable latex of 25% solids is obtained. The toluene-methyl isobutyl ketone solvent removed by distillation can be reused in the preparation of another batch of Epon 1001 latex.

The particles of the solvent-free Epon 1001 latex are examined by the transmission electron microscope and the freezing technique of preparing the samples which shows that the average particle size is in the range of 0.1–0.3μ.

Example 2

| Ingredients | gm |
| --- | --- |
| Ethylcellulose, standard ethoxy grade* | 18.75 |
| 70:15:15 toluene-methyl alcohol-methylene chloride | 106.25 |
| Sodium Lauryl Sulfate | 0.50 |
| Cetyl alcohol | 1.00 |
| Water | 375.00 |

*Having an ethoxy content of from 48.5 to 49.5% and a viscosity of 10 cps as a 5 weight percent solution in an 80:20 volume percent mixture of toluene and ethyl alcohol.

The sodium lauryl sulfate and the cetyl alcohol are dissolved in the deionized water by heating for 30 minutes at 63° C. in a one-liter, two-neck glass flask equipped with Teflon paddle stirrer and addition funnel. A solution of the ethyl cellulose is prepared by dissolving it in the solvent mixture with stirring at room temperature. The resulting solution is filtered under pressure to remove microscopic dirt. The filtered ethyl cellulose solution is then transferred to the addition funnel and a crude emulsion prepared by its addition to the water phase containing the sodium lauryl sulfate-cetyl alcohol mixture in the one-liter flask with stirring at 63° C. and the stirring continued for 30 minutes after the ethyl cellulose solution has been added. This crude emulsion comprises microscopic droplets about 1–100μ in diameter.

The crude emulsion is then subjected to homogenization by passage through the Manton-Gaulin Submicron Disperser operated at about 6000 psi, after which the average droplet size is reduced to submicroscopic size as determined by optical microscopy.

The solvents are removed from the homogenized emulsion of the fine droplet size by following the same procedure given in Example 1. A stable ethylcellulose latex is obtained with 18% solids.

The particle size of the resulting solvent-free ethylcellulose latex is examined by using the transmission electron microscope which shows that about 95% of the particles examined are in the range of 0.2μ and below, and the rest between 0.2–0.5μ with very few particles as large as 1μ.

Example 3

| Ingredients | gm |
| --- | --- |
| Polystyrene (Mol. Wt. 20,000) | 18.75 |
| Benzene | 56.25 |
| Sodium Lauryl Sulfate | 1.00 |
| Cetyl alcohol | 2.00 |
| Water | 222.00 |

The same general procedure of Example 1 is followed for the preparation of the crude emulsion, its homogenization and the removal of the solvents. The solvent-free polystyrene latex particles are examined by electron microscopy which shows that most of the particles are of 0.1μ in diameter with some of the particles as large as 0.3μ in diameter.

By taking the largest size diameter of 0.3μ and calculating what would be the size of the droplet originally formed after homogenization of polystyrene solution with 25% solids, a droplet with a diameter of 0.476μ results, which accounts for the good stability against sedimentation of the emulsion even before solvent removal. Emulsification of a higher molecular weight (35,000) polystyrene sample results in almost the same range of particle sizes.

Example 4

| Ingredients | gm |
| --- | --- |
| Epon 1001 | 31.25 |
| Toluene-methyl isobutyl ketone (1:1) | 93.75 |
| Hexadecyltrimethyl ammonium bromide | 0.78 |
| Cetyl alcohol | 1.73 |
| Water | 375.00 |

The general procedure given in Example 1 is followed for the preparation of crude emulsion, its homogenization and the solvent removal. The resulting solvent-free Epon 1001 latex of 45% solids is stable for over one year and contains particles in the range of 0.3μ in diameter and below as examined by transmission electron microscopy.

Example 5

| Ingredients | gm |
| --- | --- |
| Epon 828* | 219 |
| Toluene-methyl isobutyl ketone (1:1) | 93 |
| Hexadecyltrimethylammonium bromide | 6 |
| Cetyl alcohol | 12 |
| Water | 200 |

*Same units as in Epon 1001, pourable liquid, average Mol. Wt. 380

The same general procedure of Example 1 is followed for the preparation of crude emulsion and its homogenization except that after the preparation of the crude emulsion, only 300 cc crude emulsion are mixed with 200 cc water and the mixture passed twice through the Manton-Gaulin Submicron Disperser. The removal of solvents and the concentration of the final emulsion are carried out using the same procedure of Example 1. 350 ml of solvent-free Epon 828 emulsion with 25.2% solids are obtained which shows good shelf-stability for over one year.

Example 6

| Ingredients | gm |
| --- | --- |
| Versamid 115* | 212.5 |
| Xylene-n-butanol-isopropanol-toluene (10:25:25:40) | 212.5 |
| Hexadecyltrimethylammonium bromide | 8.5 |
| Cetyl alcohol | 17.0 |
| Water | 1357.0 |

*Epoxy curing agent, reactive polyamide condensation products of polyamines and dibasic acids from polymerized unsaturated fatty acids, Brookfield viscosity 31–38 poises at 75° C. General Mills, Amine value 230–246.

The same general procedure of Example 2 is followed for the preparation of the crude emulsion, the homogenization by passing through the Manton-Gaulin Submicron Disperser and then the removal of solvents. The homogenized emulsion is comprised of small size droplets and is stable. However, upon removal of the solvents, the emulsion with about 10% solids becomes viscous and translucent, and can be diluted indefinitely with water to give white emulsion. Also, upon standing for about 6 weeks, the viscous, translucent solvent-free Versamid 115 emulsion is found to transform to an opaque emulsion of low viscosity. Electron microscopy examination of this last emulsion shows extremely fine particles in the range of 100–500 Å, with fibril-like structure.

The above behavior is found to be unaffected by reducing the emulsifier concentration four-fold, or by leaching the Versamid-solvent mixture repeatedly with water, to remove any water-soluble components of Versamid 115, prior to emulsification.

Example 7

| Ingredients | gm |
| --- | --- |
| Ethylcellulose, standard ethoxy grade | 18.75 |
| (85:15) Benzene-Ethyl alcohol | 106.25 |
| n-decane | 1.25 |
| Sodium Lauryl Sulfate | 1.50 |
| Water | 375.00 |

The ethyl cellulose solution is prepared by dissolving it in the mixture of benzene-ethyl alcohol by rotating the bottle, which contains the mixture, end-over-end at room temperature over night. The resulting solution is filtered under pressure to remove microscopic dirt. The n-decane is then added to the filtered polymer solution and mixed well at room temperature. The sodium lauryl sulfate is mixed in the deionized water by heating at 63° C. in a one-liter, two-neck glass flask equipped with Teflon paddle stirrer and addition funnel. The crude emulsion is then prepared by adding the mixture of n-decane-prepolymer solution to the water phase containing the sodium lauryl sulfate in the one-liter flask with stirring at 63° C., and the stirring continued for 30 minutes after the prepolymer solution has been added. This crude emulsion comprises microscopic droplets about 1–100μ in diameter.

The crude emulsion is then homogenized by passing it through the Manton-Gaulin Submicron Disperser twice, after which the average droplet size (as determined by optical microscopy) is reduced below 1μ diameter. The solvents are then removed from the homogenized emulsion following the same procedure described in Example 1, and a stable emulsion of 30% solids is obtained. Examination of the particle size of the solvent-free ethylcellulose emulsion shows that all the particles are of 0.2μ in diameter and below.

Example 8

| Ingredients | gm |
| --- | --- |
| Polystyrene | 18.75 |
| Benzene | 56.25 |
| n-decane | 0.75 |
| Sodium Lauryl Sulfate | 1.00 |
| Water | 222.00 |

The same general procedure given in Example 7 is followed for the emulsification, homogenization and removal of the solvent. The resulting solvent-free polystyrene latex is stable and examination by transmission electron microscopy shows that all particles are in the range of 0.05–0.3μ.

Example 9

| Ingredients | gm |
| --- | --- |
| Epon 1001 | 50.00 |
| Toluene-methyl isobutyl ketone (1:1) | 75.00 |
| n-decane | 1.75 |
| Hexadecyltrimethylammonium bromide | 2.00 |

Example 9-continued

| Ingredients | gm |
| --- | --- |
| Water | 375.00 |

The same general procedure of Example 7 is followed for the preparation of the crude emulsion and its homogenization in the Manton-Gaulin Submicron Disperser. The homogenized emulsion comprises droplets with average size (by optical microscopy) in the range 0.2–1μ, with no obvious change in the average size over a period of two weeks which indicates good stability.

The solvents are removed from the homogenized emulsion following its preparation using the same procedure described in Example 1. The resulting solvent-free Epon 1001 emulsion with 43% solids is stable. The particles are examined under the transmission electron microscope which shows that all particles fall below 0.4μ in diameter.

Example 10

| Ingredients | gm |
| --- | --- |
| Versamid 100* | 40.00 |
| Toluene-Methylisobutyl Ketone (1:1) | 60.00 |
| n-decane | 1.00 |
| Hexadecyltrimethylammonium Bromide | 1.60 |
| Water | 300.00 |

*Chemical structure similar to Versamid 115 ninety amine value, Brookfield viscosity 7–12 poises at 150° C.

The same general procedure of Example 7 is followed for the emulsification and the removal of the solvent. The resulting emulsion with 41% solids is stable and comprises very fine droplets.

Example 11

| Ingredients | gm |
| --- | --- |
| Epon 1001 | 72.7 |
| Versamid 115 | 7.3 |
| Toluene-Methyl isobutyl ketone (1:1) | 120.0 |
| n-decane | 2.0 |
| Hexadecyltrimethylammonium bromide | 3.2 |
| Water | 600.0 |

In this example the two pre-polymer solutions are prepared separately, the first by dissolving the 72.7 gm of Epon 1001 in 109 gm of the toluene-methyl isobutyl ketone solvent mixture with stirring at room temperature, the second by dissolving the 7.3 gm of Versamid 115 in 11 gm of the solvent mixture with stirring at room temperature. Each prepolymer solution is filtered separately by pressure filtration, then the two filtered solutions are mixed well together with stirring at room temperature. The crude emulsion, its homogenization and the removal of solvent are carried out following the same general procedure of Example 7. The produced emulsion with 38% solids, is stable.

Example 12

This example shows the emulsification of Genamid-250 resin (General Mills) using a mixture of sodium lauryl sulfate-cetyl alcohol combination. Genamid-250 is a liquid epoxy curing agent which has a Brookfield viscosity of 5–10 poises (500–1000 cps) at 25° C., amine adduct, amine value 450.

| Ingredients | gm |
| --- | --- |
| Genamid-250 | 350.0 |
| Sodium Lauryl Sulfate | 11.2 |
| Cetyl alcohol | 22.4 |
| Water | 1050.0 |

The same general procedure of Example 2 is followed for the preparation of the crude emulsion as well as the following homogenization by passage through the Manton-Gaulin Submicron Disperser. The only difference is that no solvent is used to dissolve the resin due to its low viscosity, and consequently there is no need for removal of solvents. The produced Genamid-250 emulsion is paste-like and comprised of very fine droplets that can easily be diluted indefinitely with water.

Example 13

This example shows the preparation of Cationic Epon 1001 emulsion in the presence of a reactive solvent such as phenyl glycidyl ether.

| Ingredients | gm |
| --- | --- |
| Epon 1001 | 6.25 |
| phenyl glycidyl ether | 18.75 |
| Hexadecyltrimethylammonium bromide | 0.40 |
| Cetyl alcohol | 0.80 |
| Water | 75.00 |

The same general procedure of Example 1 is followed for the preparation of the crude emulsion. The homogenization of the crude emulsion is carried out by ultrasonic irradiation. The homogenization is carried out by placing the Sonifier Disruptor Horn in the beaker containing the hot crude emulsion and adjusting the power output meter to about 300 watts for two minutes. The produced emulsion comprises fine droplets in the range of $0.2-1\mu$ as determined by optical microscopy (phase contrast dark field). This emulsion shows no sign of increase in droplet size over an extended period of time which is an indication of good stability. The phenyl glycidyl ether used as a solvent is a reactive dilutent. That means that it lowers the viscosity of the Epon 1001 upon reaction therewith and becomes an integral part of the cured film; consequently, there is no need for its removal from the final emulsion. Similar stable cationic emulsions of Epon 1001/phenyl glycidyl ether with small droplet size are prepared with 0.40–1.20 and 0.4–1.60 gms of hexadecyltrimethylammonium bromide - cetyl alcohol combinations in the above recipe.

Example 14

This example shows the preparation of cationic Epon 828 emulsion in the presence of reactive solvent such as phenyl glycidyl ether.

| Ingredients | gm |
| --- | --- |
| Epon 828 | 18.75 |
| phenyl glycidyl ether | 6.25 |
| Hexadecyltrimethylammonium bromide | 0.40 |
| Cetyl alcohol | 0.80 |
| Water | 75.00 |

The same procedure of Example 13 is followed. The produced emulsion comprises droplets with diameters of $1\mu$ and below as measured by optical microscopy, which shows no sign of increase in droplet size over an extended period of time, an indication of good stability.

Example 15

This example shows the preparation of cationic Genamid-250 emulsion starting from a solvent-free resin.

| Ingredients | gm |
| --- | --- |
| Genamid-250 | 350.00 |
| Hexadecyltrimethylammonium bromide | 11.20 |
| Cetyl alcohol | 22.40 |
| Water | 1050.00 |

The same general procedure of Example 12 is followed for the preparation of the crude emulsion and it homogenization. Similar to Example 13, the produced emulsion is paste-like, comprised of very fine droplets that can easily be diluted indefinitely with water.

Example 16 (Comparative)

This example shows that in the absence of n-decane or cetyl alcohol, the emulsification of Epon 1001 resin solution with cationic emulsifier produces an emulsion which is not stable.

| Ingredients | gm |
| --- | --- |
| Epon 1001 | 40.00 |
| Toluene-methylisobutyl Ketone (1:1) | 60.00 |
| Hexadecyltrimethylammonium bromide | 1.60 |
| Water | 300.00 |

The same general procedure of Example 9 is followed except that no n-decane is added to the Epon 1001 resin. The homogenized emulsion comprises droplets sized in the range of mostly $2\mu$ and below as examined by optical microscopy. However, upon standing for 6 days, the droplet size increases to the range $1-100\mu$, which indicates destabilization.

Example 17

This example shows the use of a mixture of cationic and non-ionic emulsifier in the emulsification of Epon-1001 solution in the presence of n-decane.

| Ingredients | gm |
| --- | --- |
| Epon 1001 | 80.00 |
| 50:50 Toluene-methylisobutyl Ketone | 120.00 |
| n-decane | 2.00 |
| Hexadecyltrimethylammonium bromide | 4.80 |
| Span 80/Tween 80 (HLB = 12)* | 1.60 |
| Water | 600.00 |

*Span 80 is the oleic acid ester of sorbitan (HLB = 4.3).
*Tween 80 is the ethylene oxide ether of Span 80 (HLB = 15).
A mixture of 28:72 Span 80/Tween 80 gives HLB = 12.

The general procedure of Example 7 is followed for the preparation of the crude emulsion. In this case the 3:1 mixture of cationic and non-ionic emulsifiers is dissolved in water followed by the addition of the resin solution - n-decane mixture. The homogenization and removal of the solvent is carried out using a similar procedure to that employed in Example 7. The resulting solvent-free Epon 1001 emulsion with (39.0)% solids is stable, with particles size below $0.5\mu$ in diameter.

Example 18

This example shows the use of octadecane together with sodium lauryl sulfate in the preparation of anionic polystyrene latex by the emulsification of its benzene solution.

| Ingredients | gm |
| --- | --- |
| Polystyrene | 18.75 |
| Benzene | 56.25 |
| Octadecane | 0.75 |
| Sodium Lauryl Sulfate | 1.00 |
| Water | 222.00 |

The same general procedure of Example 8 is used. The resulting solvent-free polystyrene latex is stable and comprised of very fine particles.

Example 19

This example shows the use of tetradecane in combination with sodium lauryl sulfate in the preparation of anionic polystyrene latex.

| Ingredients | gm |
| --- | --- |
| Polystyrene | 18.75 |
| Benzene | 56.25 |
| Tetradecane | 0.75 |
| Sodium Lauryl Sulfate | 1.00 |
| Water | 222.00 |

The same general procedure of Example 8 is followed for the preparation of the crude emulsion, its homogenization and the removal of the solvent. The resulting solvent-free polystyrene latex is stable and comprised of very fine particles.

Example 20

This example shows the use of alkylamine in combination with sodium lauryl sulfate in the preparation of anionic polystyrene latex by emulsification of benzene-polystyrene solution.

| Ingredients | gm |
| --- | --- |
| Polystyrene | 18.75 |
| Benzene | 56.25 |
| Coco Amine Armeen C* | 0.75 |
| Sodium Lauryl Sulfate | 1.00 |
| Water | 222.00 |

*Mixture of C$_{8-12}$ alkylamines from coconut oil. Armak, Industrial Chemical Div., Chicago, Ill.

The same general procedure of Example 7 is followed for the emulsification and homogenization. In this example also the alkylamine is mixed with the polystyrene solution before addition to the hot solution of sodium lauryl sulfate. The produced polystyrene emulsion is stable and comprised of very fine particles which do not change with time.

Example 21

This example shows the use of another alkylamine with C$_{18}$ in the preparation of anionic polystyrene latexes by emulsification of its solution in the presence of sodium lauryl sulfate.

| Ingredients | gm |
| --- | --- |
| Polystyrene | 18.75 |
| Benzene | 56.25 |
| Alamine 7* | 0.75 |
| Sodium Lauryl Sulfate | 1.00 |
| Water | 222.00 |

*Stearyl primary amine, General Mills.

The same general procedure of Example 20 is followed. The produced polystyrene emulsion is stable and comprised of very fine droplets as examined by optical microscopy. The size of droplets does not show any sign of change over a period of two weeks, an indication of good stability.

Example 22

This example shows the use of sodium lauryl sulfate and n-decane in the emulsification of Dow Corning 200 Silicone oil fluid, which is poly (dimethylsiloxane) with a Brookfield viscosity of 316 cps at room temperature. No solvent is needed for dilution of the Silicone oil before emulsification.

| Ingredients | gm |
| --- | --- |
| Dow Corning 200 Silicone oil | 100.00 |
| n-decane | 1.50 |
| Sodium Lauryl Sulfate | 4.00 |
| Water | 300.00 |

The same general procedure of Example 7 is followed for the preparation of the crude emulsion and its homogenization, except that no solvent is required to dissolve the Silicone oil, and consequently, the step of solvent removal is eliminated. The produced emulsion is stable and comprised of very fine droplets which shows no significant change upon standing on the shelf for a very long period of time.

Example 23

This example shows the preparation of the Cationic version of Silicone Oil Emulsion of Example 22 by emulsification using hexadecyltrimethylammonium bromide - n-decane mixture.

| Ingredients | gm |
| --- | --- |
| Dow Corning 200 Silicone oil | 100.00 |
| n-decane | 1.50 |
| Hexadecyltrimethylammonium bromide | 4.00 |
| Water | 300.00 |

The same general procedure of Example 22 is followed. The produced emulsion is stable and comprised of fine droplets with no change over a long period of standing time.

Example 24

This example shows the emulsification of Elvax 4260* using n-decane Sodium Lauryl Sulfate combination.

| Ingredients | gm |
| --- | --- |
| Elvax 4260* | 500.00 |
| Sodium Lauryl Sulfate | 5.00 |
| n-decane | 5.00 |

-continued

| Ingredients | gm |
| --- | --- |
| Water | 1500.00 |

*Ethylene/vinyl acetate copolymer (as a 10% solution in toluene), with relatively high viscosity at low rate of shear and decreasing viscosity with increasing rate of shear (non-Newtonian); E.T. DuPont Co.

The same general procedure of Example 7 is followed for the preparation of the crude emulsion, homogenization and removal of solvents, except that the temperature of emulsification is 70° C. instead of 63° C. The resulting solvent-free Elvax emulsion with 26.88% solids is stable with very fine particles size which does not show any change upon standing.

Example 25

This example shows the preparation of polyester emulsion using a mixture of non-ionic and anionic surfactants together with n-decane.

| Ingredients | gm |
| --- | --- |
| Polyester* | 20.00 |
| Xylene | 30.00 |
| Renex 20** | 1.20 |
| Sodium Lauryl Sulfate | 0.40 |
| n-decane | 0.50 |
| Water | 150.00 |
| Trimethylolethane | 14.156 |
| Neopentyl Glycol | 12.703 |
| Ethylene Glycol | 7.610 |
| Isophthalic Acid | 40.870 |
| Empol 1014 Dimer acid*** | 35.776 |

The polyester is very flexible, has 0.213 equivalents OH per 100 grams, and the viscosity of 60% solution in xylene is 800 centistokes.
*Polyester used is prepared from the following components:
**Non ionic emulsifier, tall oil fatty acid/20 E.O., ICI/USA.
***Viscosity 5600 centistokes at 25° C., Acid Value 194-198, Neutralization Equivalent 283-289, Saponification Value 197-201, Emery Industries, Inc.

The same general procedure of Example 7 is used for the preparation of the crude emulsion, its homogenization and removal of solvents. The produced solvent-free polyester emulsion with 38% solids is very stable with very fine droplet size which does not change upon standing for an extended period of time.

Example 26

This example shows the use of a mixture of Aerosol MA -Renex 20 emulsifiers together with n-decane in the preparation of polyester emulsion.

| Ingredients | gm |
| --- | --- |
| Polyester | 80.00 |
| xylene | 120.00 |
| Renex 20 | 4.80 |
| Aerosol MA* | 1.60 |
| n-decane | 2.00 |
| Water | 200.00 |

The same general procedure of Example 7 is applied. The produced emulsion with % solids of 31.4 is stable.

This invention has been disclosed with respect to certain preferred embodiments, and various modifications and variations thereof obvious to those skilled in the art are to be included within the spirit and purview of this application and the scope of the appended claims. These emulsions have all the uses of currently available emulsions, e.g. paint formulations, protective coatings on innumerable substrates such as wood, metal, plastic, plaster, sheetrock, by spraying, dipping, brushing, etc.

We claim:

1. A polymer emulsification process comprising first intimately dispersing a liquified water insoluble polymer phase having a viscosity of less than about 10,000 cps in an aqueous liquid medium phase in an approximate polymer phase:aqueous phase weight ratio of 0.1:1 to 2:1 at a temperature of about 40° to about 90° C., said aqueous phase containing about 0.1 to about 5%, by weight of the water therein, of at least one nonionic, anionic or cationic oil-in-water functioning emulsifying agent, in the presence of about 0.2 to about 12%, by weight of said polymer phase, of a compound selected from the group consisting of those hydrocarbons and hydrocarbyl alcohols, ethers, amines, halides and esters which are inert, nonvolatile, water insoluble, liquid at said temperature and contain a terminal aliphatic hydrocarbyl group of at least about 8 carbon atoms, and mixtures thereof, and then subjecting the resulting crude emulsion to the action of comminuting forces sufficient to enable the production of a stable, sedimentation-resistant aqueous emulsion containing polymer particles averaging less than about $0.5\mu$ in size.

2. A process as defined in claim 1 wherein said polymer phase is a solution of said polymer in an inert volatilizable substantially water-immercible organic solvent devoid of an aliphatic hydrocarbyl group of 8 or more carbon atoms.

3. A process as defined in claim 2 followed by the step of removing said solvent from said polymer phase particles.

4. A process as defined in claim 1 wherein said liquid compound is included in the aqueous phase.

5. A process as defined in claim 4 wherein said liquid compound is a hydrocarbyl alcohol.

6. A process as defined in claim 5 wherein said liquid compound is a $C_{14-20}$ n-alkanol.

7. A process as defined in claim 1 wherein said liquid compound is included in the polymer phase.

8. A process as defined in claim 7 wherein said liquid compound is a hydrocarbon or hydrocarbyl halide, amine, ester or ether.

9. A process as defined in claim 8 wherein said liquid compound is a $C_{10-20}$ n-alkane.

10. A process as defined in claim 1 employing an anionic emulsifying agent.

11. A process as defined in claim 10 wherein said emulsifying agent is a sodium $C_{10-20}$ alkyl sulfate.

12. A process as defined in claim 1 employing a cationic emulsifying agent.

13. A process as defined in claim 12 wherein said emulsifying agent is a quaternary ammonium halide.

14. A process as defined in claim 1 employing a nonionic emulsifying agent.

15. A process as defined in claim 14 wherein said emulsifying agent is the reaction product of 1 mole of a $C_{8-18}$ alkyl phenol or $C_{10-20}$ alkanol with about 5 to 50 moles of ethylene oxide.

16. A process as defined in claim 1 wherein said comminuting forces are supplied in a homogenizer.

17. A process as defined in claim 1 wherein said comminuting forces are ultrasonic.

18. A process as defined in claim 1 wherein said polymer comprises a cellulose derivative.

19. A process as defined in claim 1 wherein said polymer comprises polymerized styrene.

20. A process as defined in claim 1 wherein said polymer comprises a poluysilicone.

21. A process as defined in claim 1 wherein said polymer comprises an ethylene/vinyl acetate copolymer.

22. A process as defined in claim 1 wherein said polymer comprises a polyester.

23. An aqueous emulsion produced by the process of claim 1.

24. An aqueous emulsion produced by the process of claim 3.

25. A process as defined in claim 6 wherein said alkanol is cetyl alcohol.

26. An aqueous emulsion produced by the process of claim 25.

27. A process as defined in claim 9 wherein said alkane is n-decane.

28. An aqueous emulsion produced by the process of claim 27.

* * * * *